June 2, 1925.   1,540,362
C. A. NORVELL
MACHINE FOR MEASURING AND CUTTING PACKING
Filed May 2, 1924   2 Sheets-Sheet 1
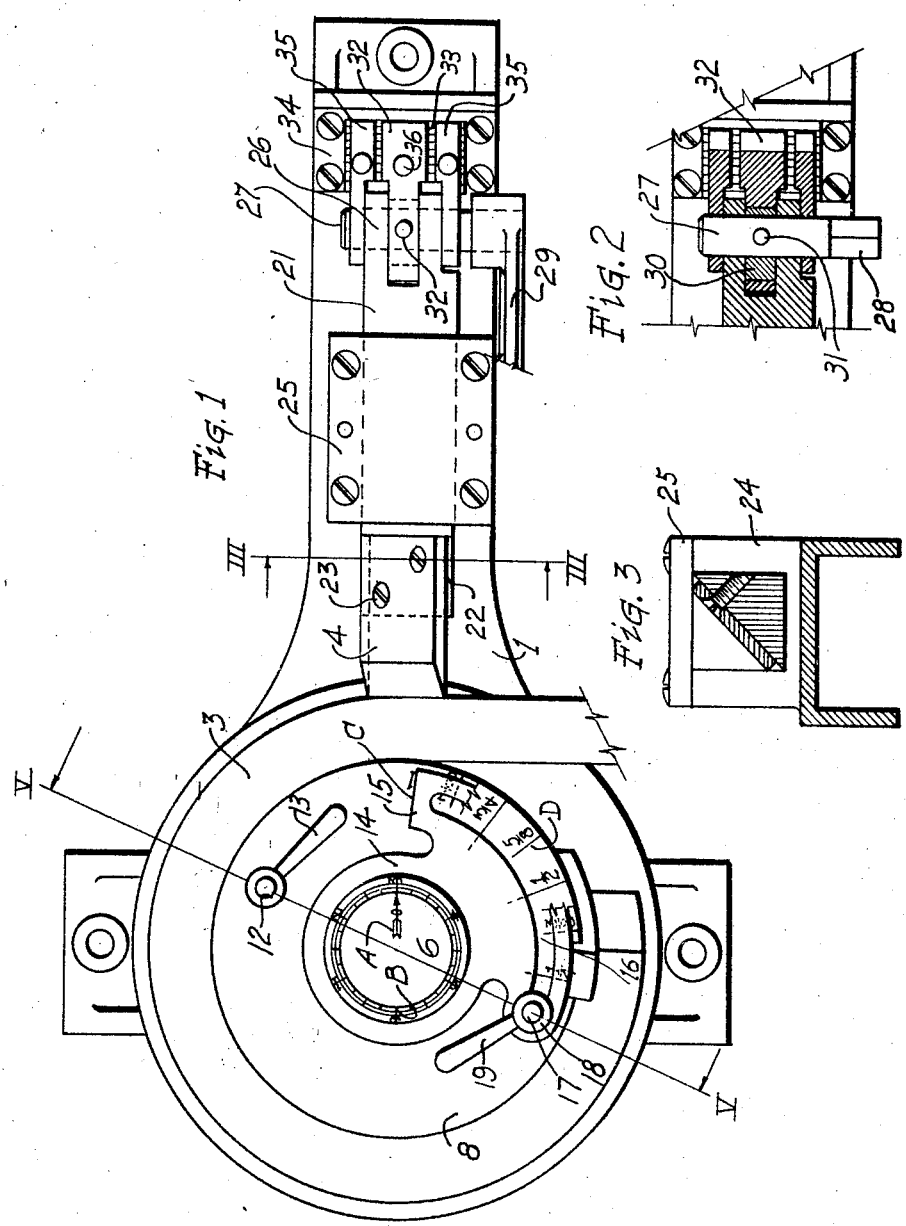
INVENTOR
Charles A. Norvell
BY J.H.Weatherford
ATTORNEY June 2, 1925.　　　　　　　　　　　　　　　1,540,362
C. A. NORVELL
MACHINE FOR MEASURING AND CUTTING PACKING
Filed May 2, 1924　　　2 Sheets-Sheet 2
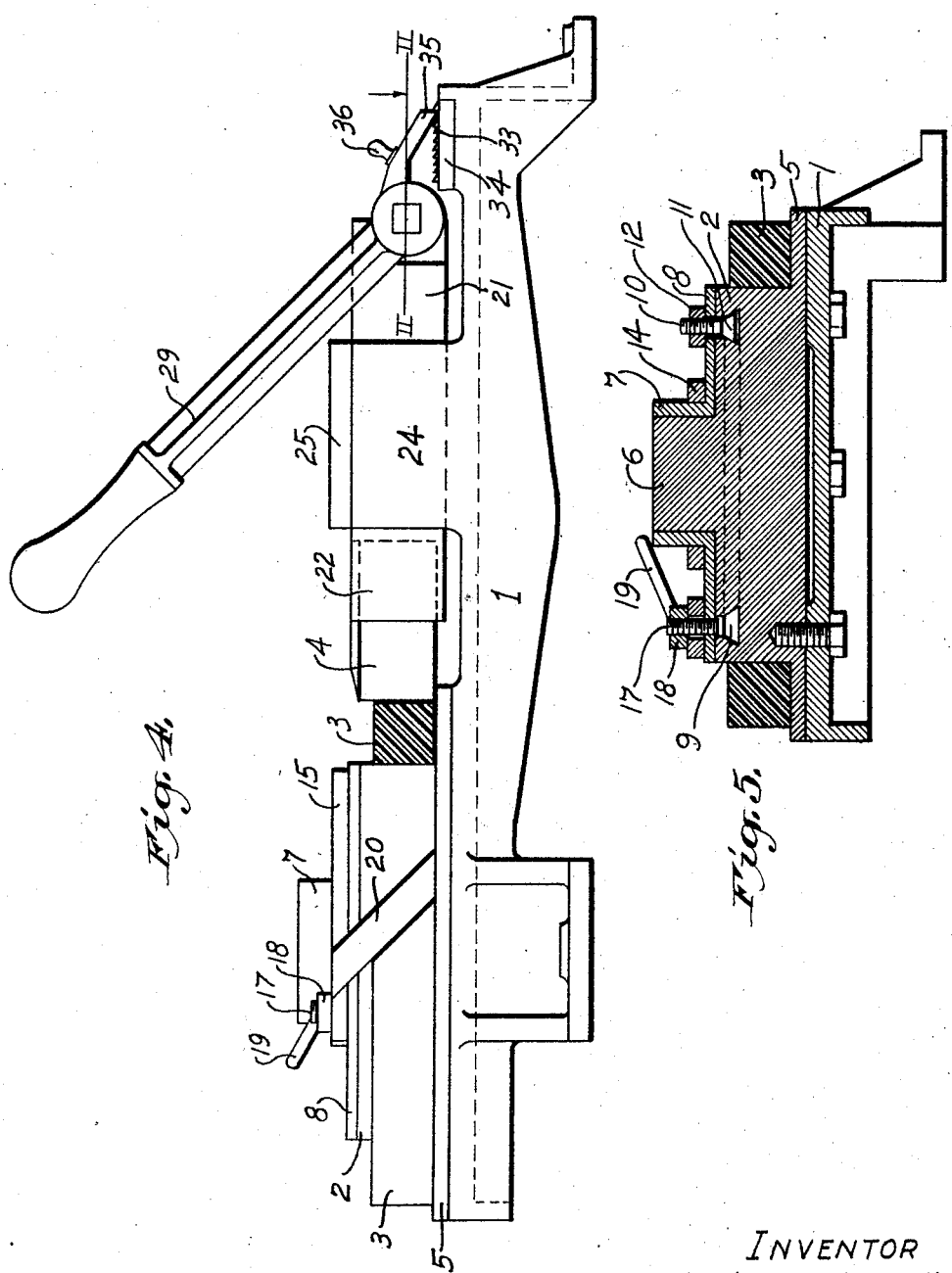
INVENTOR
Charles A. Norvell
By J. H. Weatherford
ATTORNEY Patented June 2, 1925.

1,540,362

UNITED STATES PATENT OFFICE.

CHARLES A. NORVELL, OF MEMPHIS, TENNESSEE.

MACHINE FOR MEASURING AND CUTTING PACKING.

Application filed May 2, 1924. Serial No. 710,689.

*To all whom it may concern:*

Be it known that I, CHARLES A. NORVELL, a citizen of the United States, residing at Memphis, county of Shelby, and State of Tennessee, have invented certain new and useful Improvements in Machines for Measuring and Cutting Packing, of which the following is a full, clear, and exact description, such as will enable anyone skilled in the art to make and use the same.

My invention relates to machines for cutting pre-formed packing for use around piston rods or other cylindrical parts of a machine and more especially to a machine which will measure the packing as well as provide means for cutting off the measured length.

The objects of my invention are,

First, to provide means whereby the proper length of packing may be cut off for any particular size of rod or shafting by the simple device of bringing the index figure for that size shafting opposite the zero point.

Second, to provide means for compensating in such measurements for varying sizes of packing.

Third, to provide proper stops for the packing to abut against while the measurement is being made.

Fourth, to provide means for cutting off the packing when the same shall have been measured, and Fifth, to generally improve the details of construction of such a machine.

These objects are accomplished by taking advantage of the fact that the relation of the circumference of a circle to its diameter is constant.

Second, by providing a sliding stop which may be adjustably located with reference to the main index to compensate for the extra length of packing necessary as the size, or diameter, of the packing increases.

Third, by providing a knife for cutting off the packing with means for forcing the knife forward, and Fourth, by improving the details of construction as will be more fully hereinafter set out in the drawings, specification and claims.

In the drawings:—

Fig. 1 is a plan of the machine showing a piece of packing in place ready to be cut.

Fig. 2 is a fragmentary section on the line II—II of Fig. 4 showing the actuating mechanism for the knife.

Fig. 3 is a section on the line III—III of Fig. 1, looking in the direction of the arrow.

Fig. 4 is a side elevation of the machine with the packing in place ready to be cut, and Fig. 5 is a section on the line V—V of Fig. 1.

Referring now to the drawings in which the various parts are indicated by the same numeral in all the views. 1 is the base for the machine to which is securely fastened a cylindrical anvil 2 around which the packing 3 may be placed for cutting and against which the packing is forced when the knife 4 is making the cut. 5 is a flange projecting laterally from the base of the anvil 2 on which the packing 3 rests. 6 is an axially aligned hub projecting vertically from the top of the anvil 2 and intregal therewith, or rigidly attached thereto. Revolubly mounted on the hub 6 is an index member comprising an annular cylinder 7 closely fitting the hub 6 and of equal height therewith from which extends a lateral flange 8 which rests on the upper surface of the anvil 2, this index plate being adapted to be freely turned around the central hub 6. The anvil 2 has formed in the upper end thereof an under cut annular groove 9. 10 is a bolt having a T head 11 adapted to slide within the groove 9 and having its shank projecting upward therefrom through the flange 8. 12 is a nut for the bolt 10 preferably provided with a handle 13, by which the flange 6 may be clamped against the anvil 2 and thereby be held against any movement relative to the said anvil. Resting on the flange 8 and revolubly mounted around the annular cylinder 7 is a collar 14 from which collar a compensating quadrant 15 extends laterally, this quadrant being provided with an arcuate slot 16 concentric with the hub 6. 17 is a clamping stud one end of which is screwed into the flange 8 and which stud projects upward from this plate through the slot 16. 18 is a clamping nut for this stud which nut is preferably provided with a handle 19 by means of which nut the compensating quadrant 15 may be secured to the plate 8. 20 is a packing stop which projects downward from the quadrant 15 and lies against and slides loosely around the cylindrical surface of the anvil 2. A is an index mark or pointer stamped on the upper surface of the hub 6, the upper surface of the cylinder 7 being provided with contiguous graduations B which graduations represent the size of the shafting or rod for which the packing is to be cut.

Preferably the diameter of the anvil 2 is 3.14159 (or "pi") times the diameter of the hub 6. In such case a measurement of one inch on the periphery of the hub would represent a shaft one inch in diameter and correspondingly the peripheral measurement on the surface of the anvil for the same angular distance would represent the corresponding circumferential measurement of a one inch shaft. The same thing would also be true for a two inch, or any other, measurement which the size of the hub permits.

In practice, I prefer to make the size of the hub 6 such that its circumference would be exactly 6 inches and the circumference of the anvil therefore will be exactly 3.14159 times that amount. I am thus able to lay off the hub 6 in six equal spaces each measuring exactly one inch and by dividing these spaces in sixteenths, to provide for any diameter of shaft up to six inches, and correspondingly to cut any desired length of packing therefor. It will of course be evident that this relation of hub diameter to anvil diameter need not be followed, except for the convenience of measurement; for it would be entirely possible to measure off on the anvil 3.14159 inches and use the angle subtended by this arc to determine the angular measurement on the hub, irrespective of whether this measurement on the hub be one inch or more, or less.

I find however, that while the relation so set up is correct for measurements against the face of the anvil that varying sizes of packing bent around the anvil and cut off will not close around the corresponding size shaft. In other words, when a piece of packing say one-half inch square, is wrapped around the anvil for cutting the measurement of length therefor must be made not against the face of the anvil, but at a point radially there outside, and that this additional length increases directly as the size of the packing increases. In order therefore, to compensate for this varying factor, I provide the compensating quadrant 15 carrying the packing stop 20 preferably making the end "C" of this quadrant an index pointer and measuring off on the upper surface of the flange 8 divisions "D" which show the amount this quadrant will have to be shifted to compensate for the radial thickness of the packing wrapped around the anvil for cutting.

In Fig. 1 I have broken away a portion of the quadrant 15 in order that these divisions and the indicating markings therefor may be more clearly seen.

The cutting knife 4 is attached to a rectangular plunger 21, the front end 22 of which is beveled at 45 degrees to form a seat for the knife and a shoulder for it to abut against, the knife 4 being secured against this seat preferably by counter sunk head cap screws 23. The plunger 21 is slidably mounted in a guide 24 and is held down therein by cover plate 25, this guide 24 being either an integral part of the base 1, or securely attached thereto. The rear end of the plunger 21 is slotted forming fork members 26 through which is passed a pin 27 having one end 28 extending outward and preferably squared to receive a handle 29. Lying between the two fork members 26 is an eccentric 30 which is secured to the pin 27 by a through pin or key 31 or in some other suitable manner. Mounted on this eccentric 30 is a thrust pawl 32, the swinging end of which pawl engages notches 33 cut laterally across a hardened steel plate 34 secured to the base 1 though these notches may be cut in the metal of the base if it be so desired. Mounted outside of the fork members 26 on the pin 27 are pawls 35 which also engage the notches 33 only one of these pawls being necessary although two, as shown, may be used if so desired. 36 are handles by which these pawls may be raised when it is desired to back the knife out after making the cut.

In using the machine a piece of packing 3 of the desired size required for a particular job is placed on the flange 5 and against the anvil 2 and the end cut off by ratcheting the knife 4 forward by back and forth strokes of the handle, 29, the pawls 32 and 35 alternately engaging the notches 33 during this operation. Either previous to, or after making this cut the index pointer A is brought opposite the marking B indicating the shaft diameter around which this particular piece of packing is to be used. In the case shown in the drawings, this is a three inch shaft. The plate 8 is thereupon clamped to the anvil 2 by tightening the nut 12. Thereafter the indicating end C of the quadrant 15 is brought opposite the graduations D representing the size of the packing in this case one inch square, and the quadrant 15 is clamped against the flange 8 by means of the nut 18. The end of the packing previously cut off is brought around the anvil 2 until it rests against the packing stop 20 when the desired opposite end or cut off point on the packing will be in proper position with relation to the knife 4. Thereafter the knife 4 is ratcheted forward as in the previous case and the packing cut off.

Should an additional length of this same packing be desired for the same shaft, it will of course be necessary only to slip the packing forward around the anvil and against the stop 20 again and cut off an additional piece. Should it be desired to change the size of packing for the same size shaft, it would be necessary to re-set the compensating quadrant only. Should it be desired to cut the same size packing for a smaller shaft, the quadrant would be left unchanged and the index pointer A be brought to the proper size shaft graduation.

If the size of shaft and size of packing both differ, it will of course be necessary to re-set both the adjusting quadrant and the shaft size indicator.

It will be understood that numerous changes may be made in the details of this machine. One of these, namely, the relation of the diameter of the hub to the diameter of the anvil has already been set out. The form of annular groove 9 may be changed and correspondingly the form of T head bolt 10. Wing nuts of course may be substituted for the handle nuts 12 and 18 or plain nuts may be used. The angle of the knife 4 may be varied although I consider the 45 degree cut as the best. The knife 4 may be integral with the plunger 21 instead of secured thereto and other attaching means may be used instead of the counter sunk head screws 23. The eccentric 31 may be otherwise secured to the pin 27, and as before stated one or two retaining pawls 35 may optionally be used.

The indicating mark "A" may be on the index plate and correspondingly the graduations B on the hub 6 instead of as shown, and likewise the graduations "D" may be transferred to the quadrant 15 and the indicating mark be correspondingly transferred to the index plate 8.

Numerous other changes may be made in the design and construction of the machine without departing in any way from the spirit of my invention.

Having now fully described my invention, what I claim and desire to secure by Letters Patent in the United States is:—

1. In a packing cutter, an anvil, an index plate, cooperative markings on said anvil and plate for indicating relative positions of said plate and anvil for varying shaft sizes, a compensating quadrant, a packing stop carried by said quadrant, cooperating markings on said quadrant and index plate for indicating relative positions of said quadrant and plate for varying packing sizes, a cutting knife and means for forcing said knife forward against said anvil.

2. In a packing cutter, a base, an anvil secured thereto, an index plate, cooperative markings on said anvil and plate for indicating relative positions of said anvil and plate for varying shaft sizes, a compensating quadrant, a packing stop carried by said quadrant, cooperating markings on said quadrant and index plate for indicating relative positions of said quadrant and plate for varying packing sizes, a cutting knife reciprocally mounted on said base and means for forcing said knife forward against said anvil.

3. In a packing cutter, a base, an anvil mounted thereon, an index plate, cooperative markings on said anvil and plate for indicating relative positions of said anvil and plate for varying shaft sizes, a compensating quadrant, a packing stop carried by said quadrant, cooperating markings on said quadrant and index plate for indicating relative positions of said quadrant and plate for varying packing sizes, and means for cutting said packing.

4. In a packing cutter, an anvil, an index plate, cooperative markings on said anvil and plate for indicating relative positions of said anvil and plate for varying shaft sizes, locking means for said anvil and plate, a compensating quadrant, a packing stop carried by said quadrant, cooperating markings on said quadrant and index plate for indicating relative positions of said quadrant and plate for varying packing sizes, locking means for said quadrant and plate, a cutting knife and operating means therefor.

5. In a packing cutter, a cylindrical anvil having a central hub extending upward therefrom, an index plate surrounding said hub and turnable therearound, said hub and plate having one an indicating mark and the other graduations to provide indicating means whereby said anvil and plate may be relatively adjusted for varying sizes of shaft for which said packing is to be used, a compensating quadrant resting on said plate and rotatably shiftable thereon, said plate and quadrant having one a pointer and the other graduations thereon to provide indicating means whereby said quadrant and said index plate may be relatively shifted for varying sizes of packing to be cut, a packing stop carried by said quadrant, a cutting knife and means for forcing said knife forward against said anvil to cut off said packing.

6. In a packing cutter, a base, a cylindrical anvil having a central hub extending upward therefrom secured to said base, an index plate surrounding said hub and turnable therearound, said hub and plate having one an indicating mark and the other graduations to provide indicating means whereby said anvil and plate may be relatively adjusted for varying sizes of shaft for which said packing is to be used, a compensating quadrant resting on said plate and rotatably shiftable thereon, said plate and quadrant having one an indicator and the other graduations thereon to provide indicating means whereby said quadrant and said index plate may be relatively adjusted for varying sizes of packing to be cut, a packing stop carried by said quadrant, a cutting knife reciprocally mounted on said base, and means for forcing said knife forward against said anvil to cut off said packing.

7. In a packing cutter, a cylindrical anvil having a central hub extending upward therefrom, an index plate surrounding said hub and turnable therearound, said hub and plate having the one an indicating mark and the other graduations to provide indicating means whereby said anvil and plate may be relatively adjusted for varying sizes of shaft for which said packing is to be used, a compensating quadrant resting on said plate and rotatably shiftable thereon, said plate and quadrant having one an indicator and the other graduations thereon to provide indicating means whereby said quadrant and said index plate may be relatively adjusted for varying sizes of packing to be cut, a packing stop carried by said quadrant, and means for cutting said packing.

8. In a packing cutter, a cylindrical anvil having a central hub extending upward therefrom, an index plate surrounding said hub and turnable therearound, said hub and plate having the one an indicating mark and the other graduations to provide indicating means whereby said anvil and plate may be relatively adjusted for varying sizes of shaft for which said packing is to be used, locking means for said anvil and plate, a compensating quadrant resting on said plate and rotatably shiftable thereon, said plate and quadrant having one an indicator and the other graduations thereon to provide indicating means whereby said quadrant and said index plate may be relatively adjusted for varying sizes of packing to be cut, locking means for said plate and quadrant, a packing stop carried by said quadrant, a cutting knife and means for forcing said knife forward against said anvil to cut off said packing.

In testimony whereof I have hereunto set my name.

CHARLES A. NORVELL.